United States Patent
Gatmir-Motahari et al.

(10) Patent No.: US 8,818,409 B1
(45) Date of Patent: Aug. 26, 2014

(54) IDENTIFICATION OF FREQUENT LOCATIONS OF A WIRELESS COMMUNICATION DEVICE

(71) Applicant: Sprint Communications Company L.P., Overland Park, KS (US)

(72) Inventors: Sara Gatmir-Motahari, Millbrae, CA (US); Kosol Jintaseranee, San Jose, CA (US); Phyllis J. Reuther

(73) Assignee: Sprint Communications Company L.P., Overland Park, KS (US)

( * ) Notice: Subject to any disclaimer, the term of this patent is extended or adjusted under 35 U.S.C. 154(b) by 1 day.

(21) Appl. No.: 13/666,749

(22) Filed: Nov. 1, 2012

(51) Int. Cl.
*G06F 15/16* (2006.01)

(52) U.S. Cl.
USPC ..................... 455/456.1; 455/456.4

(58) Field of Classification Search
USPC .............. 455/435.1, 456.1, 456.2, 456.4
See application file for complete search history.

(56) References Cited

U.S. PATENT DOCUMENTS

| 7,822,426 B1 | 10/2010 | Wuersch |
| 2010/0039315 A1 | 2/2010 | Malkos et al. |
| 2010/0210285 A1 | 8/2010 | Pande et al. |

*Primary Examiner* — Sam Bhattacharya

(57) ABSTRACT

A frequent location determination system to identify a location frequented by a wireless communication device comprises a processing system. The processing system is configured to process network usage data for the wireless communication device to identify a cell sector in a wireless communication network that is used by the wireless communication device more than a plurality of other cell sectors in the wireless communication network. The processing system is further configured to process user data transferred by the wireless communication device from the cell sector to identify Global Positioning System (GPS) data, and to process the GPS data to determine a subset of the GPS data that indicates locations in the cell sector. The processing system is further configured to process the subset of the GPS data that indicates the locations in the cell sector to determine a frequent location of the wireless communication device within the cell sector.

20 Claims, 6 Drawing Sheets

IDENTIFICATION OF FREQUENT LOCATIONS OF A WIRELESS COMMUNICATION DEVICE

TECHNICAL BACKGROUND

Wireless communication devices transmit and receive information wirelessly via a wireless access node to communicate over a communication network. When a user of a wireless communication device requests a communication service from a network service provider, information associated with the service request may be generated. One type of such information is Customer Proprietary Network Information (CPNI). CPNI may include identifying information about a user, the time, date, duration, and destination number of a call, the types of service that the user subscribes to, and identification of specific locations where the user is accessing the communication service, such as Global Positioning System (GPS) records.

Network service providers typically have an interest in identifying the locations where their subscribers are accessing the network and consuming network resources. However, information that identifies the exact locations where subscribers are accessing the network may be considered private user information. Therefore, network service providers have an interest in minimizing the exposure of this type of user data to preserve the privacy of their subscribers. At the same time, a network service provider desires to obtain accurate estimations of the locations where their subscribers access and utilize the network, but the network service provider has a competing interest in ensuring that these location traces still address the privacy concerns of their subscribers.

OVERVIEW

A method of identifying a location frequented by a wireless communication device is disclosed. The method comprises processing network usage data for the wireless communication device to identify a cell sector in a wireless communication network that is used by the wireless communication device more than a plurality of other cell sectors in the wireless communication network. The method further comprises processing user data transferred by the wireless communication device from the cell sector to identify Global Positioning System (GPS) data. The method further comprises processing the GPS data to determine a subset of the GPS data that indicates locations in the cell sector. The method further comprises processing the subset of the GPS data that indicates the locations in the cell sector to determine a frequent location of the wireless communication device within the cell sector.

A frequent location determination system to identify a location frequented by a wireless communication device comprises a processing system. The processing system is configured to process network usage data for the wireless communication device to identify a cell sector in a wireless communication network that is used by the wireless communication device more than a plurality of other cell sectors in the wireless communication network. The processing system is further configured to process user data transferred by the wireless communication device from the cell sector to identify Global Positioning System (GPS) data, and to process the GPS data to determine a subset of the GPS data that indicates locations in the cell sector. The processing system is further configured to process the subset of the GPS data that indicates the locations in the cell sector to determine a frequent location of the wireless communication device within the cell sector.

A computer apparatus to identify a location frequented by a wireless communication device comprises software instructions and at least one non-transitory computer-readable storage medium storing the software instructions. The software instructions are configured, when executed by a computer system, to direct the computer system to process network usage data for the wireless communication device to identify a cell sector in a wireless communication network that is used by the wireless communication device more than a plurality of other cell sectors in the wireless communication network. The software instructions are further configured to direct the computer system to process user data transferred by the wireless communication device from the cell sector to identify Global Positioning System (GPS) data. The software instructions are further configured to direct the computer system to process the GPS data to determine a subset of the GPS data that indicates locations in the cell sector. The software instructions are further configured to direct the computer system to process the subset of the GPS data that indicates the locations in the cell sector to determine a frequent location of the wireless communication device within the cell sector.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
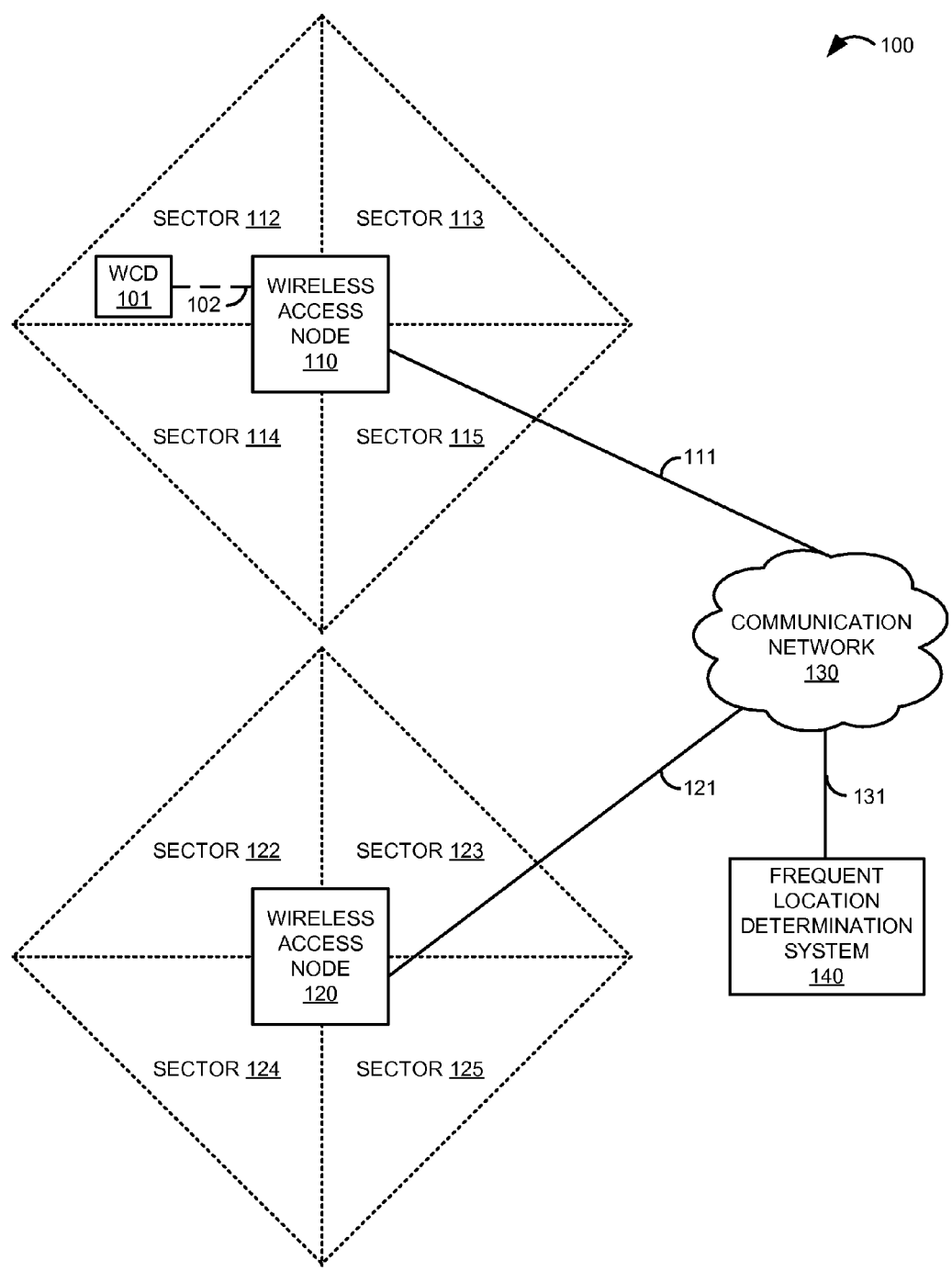
FIG. 1 is a block diagram that illustrates a communication system.

FIG. 1 is a block diagram that illustrates communication system 100. Communication system 100 includes wireless communication device (WCD) 101, wireless access nodes 110 and 120, communication network 130, and frequent location determination system 140. In FIG. 1, wireless access node 110 serves cell sectors 112-115, and wireless access node 120 serves cell sectors 122-125. Sectors 112-115 and 122-125 shown in FIG. 1 represent geographic areas of signal coverage served by respective wireless access nodes 110 and 120. In particular, cell sectors 112-115 served by wireless access node 110 are adjacent to node 110, while cell sectors 122-125 served by wireless access node 120 are adjacent to node 120. Wireless access node 110 and communication network 130 communicate over communication link 111, while wireless access node 120 and communication network 130 communicate over communication link 121. Communication network 130 and frequent location determination system 140 communicate over communication link 131. Wireless communication device 101 and wireless access node 110 are in communication over wireless communication link 102. As shown in FIG. 1, wireless communication device 101 is presently located in cell sector 112 served by wireless access node 110.

Figure 2:
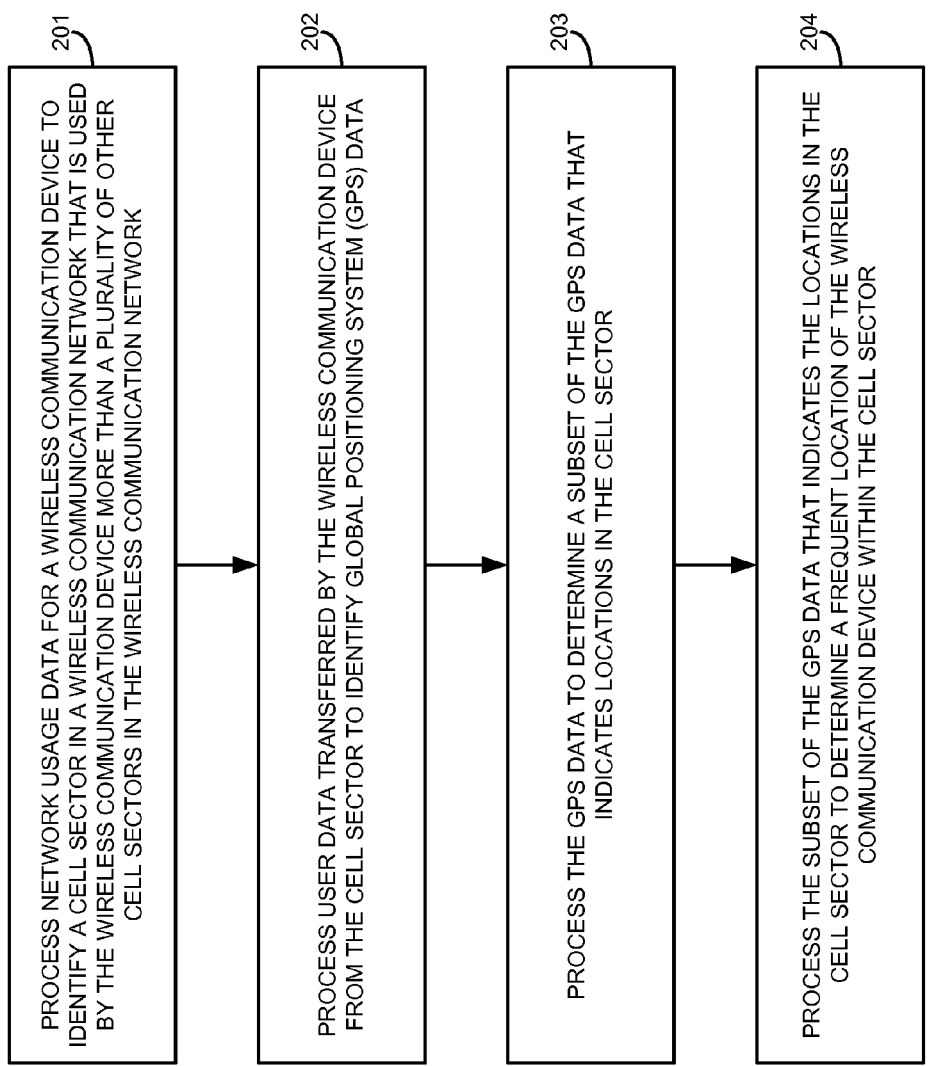
FIG. 2 is a flow diagram that illustrates an operation of the communication system.

FIG. 2 is a flow diagram that illustrates an operation of communication system 100. The steps of the operation are indicated below parenthetically. Initially, frequent location determination system 140 processes network usage data for wireless communication device 101 to identify a cell sector 112 in a wireless communication network that is used by wireless communication device 101 more than a plurality of other cell sectors 113-115 and 122-125 in the wireless communication network (201). The network usage data for wireless communication device 101 can include information associated with calls in which wireless communication device 101 participated, such as call detail records (CDRs), as well as short message service (SMS) text messages and data usage records. Typically, the network usage data includes network-based location estimations for wireless communication device 101 based on information available from network equipment and devices. For example, location determination techniques such as trilateration or multilateration of radio signals could be employed to estimate the location of wireless communication device 101 and such location estimations could be included in the network usage data for wireless communication device 101. Additionally or alternatively, cell identification techniques such as cell of origin and control plane locating could provide location data points for wireless communication device 101 in the network usage data. The network usage data could further include course location messages (CLM), which provide the latitude and longitude of a serving network sector 112. In some examples, information that is accessible from communication network 130, such as a serving mobile switching center (MSC) or a switch that wireless communication device 101 registered with, a database that stores location information for device 101 such as a home location register (HLR), data that may be broadcast in the overhead or other messaging from a serving wireless access node 110, a system identification number (SID) and a network identification number (NID) associated with a serving sector 112 of wireless access node 110, a trunk group identifier, or any other information from other network elements could be included in the network usage data.

Based on the above and other information included in the network usage data, frequent location determination system 140 processes the network usage data for wireless communication device 101 to identify a cell sector in the wireless communication network that is used by wireless communication device 101 more than other cell sectors in the wireless communication network. For purposes of this example, frequent location determination system 140 identifies cell sector 112 as being used by wireless communication device 101 more than the plurality of other cell sectors 113-115 and 122-125 in the wireless communication network.

Frequent location determination system 140 processes user data transferred by wireless communication device 101 from the cell sector 112 to identify Global Positioning System (GPS) data (202). The user data transferred by wireless communication device 101 may include any information transmitted by wireless communication device 101, including information associated with calls, SMS text messaging, and data usage conducted by wireless communication device 101.

In some examples, the user data comprises GPS records and other GPS data associated with wireless communication device 101, which typically includes geographical coordinates of the location of wireless communication device 101, such as GPS coordinates or latitude and longitude. For example, wireless communication device 101 may utilize GPS circuitry to obtain the location of wireless communication device 101 while device 101 is located in cell sector 112, and this location information may be transferred to communication network 130 from cell sector 112 as part of the user data. Other GPS data may also be included in the user data transferred by wireless communication device 101 from cell sector 112, and frequent location determination system 140 can process the user data to identify any GPS data contained therein. In some examples, frequent location determination system 140 processes the user data transferred by wireless communication device 101 from cell sector 112 to identify the GPS data by identifying the GPS data that correlates to a base station identifier (BSID) associated with cell sector 112.

The GPS data is processed by frequent location determination system 140 to determine a subset of the GPS data that indicates locations in cell sector 112 (203). Typically, frequent location determination system 140 may process the GPS data to determine the subset of the GPS data that indicates the locations in cell sector 112 by eliminating from the GPS data any information that indicates a location outside of cell sector 112. For example, a user of wireless communication device 101 may send or receive GPS coordinates in a SMS text message while in cell sector 112, such as a location of a business meeting or some other establishment that is not located within sector 112, or click a hyperlink on a website that provides GPS coordinates of a location outside of sector 112, and these GPS coordinates would not be included in the subset of the GPS data that indicates locations in cell sector 112. In another example, the user of wireless communication device 101 may access driving directions to some destination outside of cell sector 112 and the GPS data transferred by wireless communication device 101 from cell sector 112 may include this destination, which would not be included in the subset of the GPS data that indicates locations in cell sector 112.

Frequent location determination system 140 processes the subset of the GPS data that indicates the locations in cell sector 112 to determine a frequent location of wireless communication device 101 within cell sector 112 (204). Determining the frequent location of wireless communication device 101 could be achieved in a variety of ways. Typically, frequent location determination system 140 determines the frequent location of wireless communication device 101 within cell sector 112 based on where a majority of the subset of the GPS data is concentrated. In some examples, frequent location determination system 140 could determine error intervals of the subset of the GPS data and find the intersections where such error intervals overlap in order to determine the frequent location of wireless communication device 101. Additionally or alternatively, frequent location determination system 140 could compute the centroid of the subset of the GPS data records to identify the frequent location of wireless communication device 101. In some examples, the currency of the subset of the GPS data could be considered when determining the frequent location of wireless communication device 101. For example, frequent location determination system 140 could process the subset of the GPS data that indicates the locations in cell sector 112 to determine the frequent location of wireless communication device 101 within cell sector 112 by ordering the subset of the GPS data according to time stamps associated with the subset of the GPS data. This could be accomplished by ranking more recent data of the subset of the GPS data higher than other data of the subset of the GPS data in some examples. The frequent location of wireless communication device 101 within cell sector 112 could then be determined based on the more recent data of the subset of the GPS data.

Advantageously, frequent location determination system 140 systematically filters network usage data and user data to first identify a cell sector 112 that is more frequently used by wireless communication device 101, and then a location within that cell sector 112 where wireless communication device 101 is most frequently located. Typically, this frequent location of wireless communication device 101 may be near a home or office location of the user of wireless communication device 101. In this manner, greater accuracy is achieved in determining a frequent location of wireless communication device 101, while simultaneously preserving the user's privacy.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access nodes 110 and 120 each comprise RF communication circuitry and an antenna. The RF communication circuitry typically includes an amplifier, filter, RF modulator, and signal processing circuitry. Wireless access nodes 110 and 120 may also comprise a router, server, memory device, software, processing circuitry, cabling, power supply, network communication interface, structural support, or some other communication apparatus. Wireless access nodes 110 and 120 could each comprise a base station, Internet access node, telephony service node, wireless data access point, or some other wireless communication system—including combinations thereof. Some examples of wireless access nodes 110 and 120 include a base transceiver station (BTS), base station controller (BSC), radio base station (RBS), Node B, enhanced Node B (eNode B), and others. Wireless network protocols that may be utilized by wireless access nodes 110 and 120 include CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof.

Cell sectors 112-115 and 122-125 each comprise geographic areas with approximate boundary lines as indicated by the dotted lines on FIG. 1, which are typically defined by the signal propagation characteristics and coverage capabilities of respective wireless access nodes 110 and 120. Wireless access node 110 serves sectors 112-115 and wireless access node 120 serves sectors 122-125. Each sector 112-115 and 122-125 represents a different coverage area of their respective wireless access nodes 110 and 120. For example, each sector 112-115 served by wireless access node 110 may be served by separate antennas of wireless access node 110, providing each sector 112-115 a separate direction of tracking and/or different range with respect to the other sectors. As shown in FIG. 1, sectors 112-115 served by wireless access node 110 are adjacent to node 110, while sectors 122-125 served by wireless access node 120 are adjacent to node 120.

Communication network 130 comprises the core network of a wireless communication provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Frequent location determination system 140 comprises a processing system and communication transceiver. Frequent location determination system 140 may also include other components such as a router, server, data storage system, and power supply. Frequent location determination system 140 may reside in a single device or may be distributed across multiple devices. Frequent location determination system 140 may be a discrete system or may be integrated within other systems—including other systems within communication system 100. In some examples, frequent location determination system 140 could comprise a home agent, packet data serving node (PDSN), network switch, mobile switching center, router, switching system, packet gateway, network gateway system, Internet access node, application server, service node, firewall, or some other communication system—including combinations thereof.

Wireless communication link 102 uses the air or space as the transport medium. Wireless communication link 102 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof. Wireless communication link 102 may comprise many different signals sharing the same link. For example, wireless communication link 102 could include multiple signals operating in a single propagation path comprising multiple communication sessions, frequencies, timeslots, transportation ports, logical transportation links, network sockets, IP sockets, packets, or communication directions—including combinations thereof.

Communication links 111, 121, and 131 use metal, air, space, optical fiber such as glass or plastic, or some other material as the transport medium—including combinations thereof. Communication links 111, 121, and 131 could use various communication protocols, such as TDM, IP, Ethernet, telephony, optical networking, hybrid fiber coax (HFC), communication signaling, wireless protocols, or some other communication format—including combinations thereof. Communication links 111, 121, and 131 may be direct links or could include intermediate networks, systems, or devices.

Figure 3:
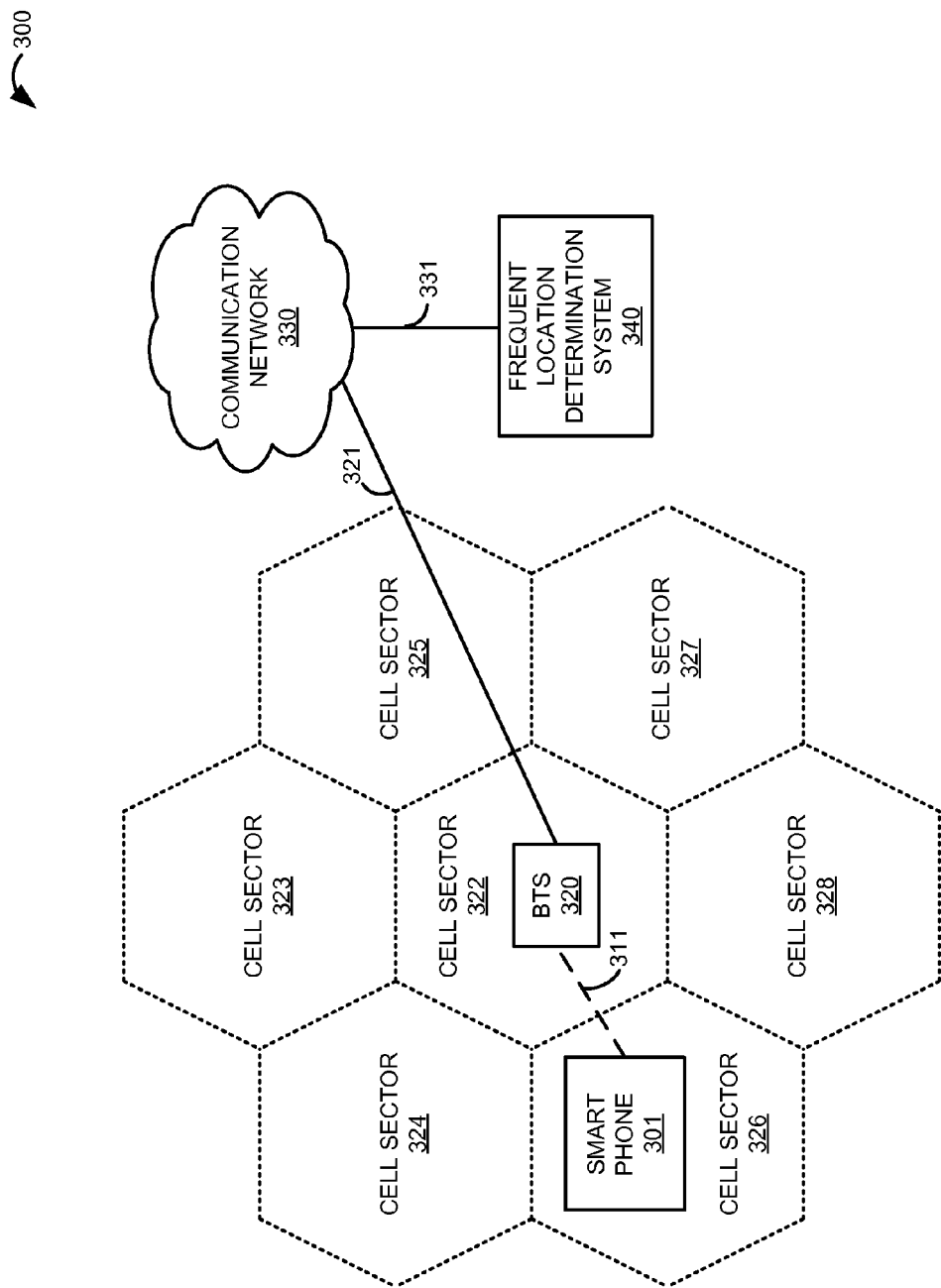
FIG. 3 is a block diagram that illustrates a communication system in an exemplary embodiment.

FIG. 3 is a block diagram that illustrates communication system 300. Communication system 300 includes smartphone 301, base transceiver station (BTS) 320, communication network 330, and frequent location determination system 340. As shown in FIG. 3, smartphone 301 and BTS 320 are presently in communication over wireless communication link 311. BTS 320 and communication network 330 communicate over communication link 321. Communication network 340 and frequent location determination system 340 are in communication over communication link 331. BTS 320 provides cell sector coverage to sectors 322-328. In FIG. 3, smartphone 301 is shown located within cell sector 326. For purposes of the following discussion with respect to FIGS. 4 and 5, it is assumed that frequent location determination system 340 has processed network usage data for smartphone 301 and has identified that cell sector 326 is used by smartphone 301 more than the plurality of other cell sectors 322-325, 327, and 328 that are shown in FIG. 3.

Figure 4:
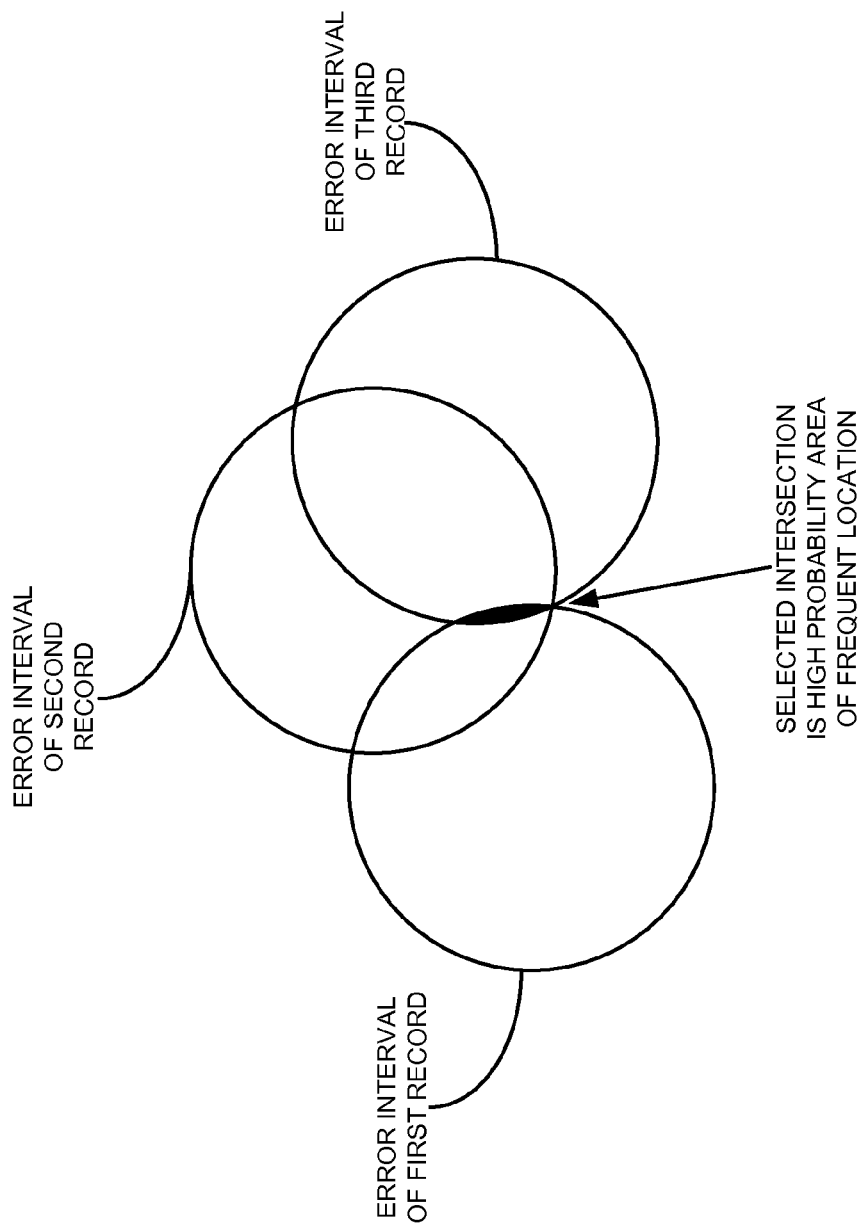
FIG. 4 is a plot diagram that illustrates error intervals of GPS records within a cell sector in an exemplary embodiment.

FIG. 4 is a plot diagram that illustrates error intervals of GPS records transferred by smartphone 301 within cell sector 326 in an exemplary embodiment. As discussed above with respect to FIG. 3, location determination system 340 has identified cell sector 326 as being used by smartphone 301 more than any other of the cell sectors 322-325, 327, and 328. The error intervals for only three GPS records are shown in FIG. 4 for clarity, but typically there would be many more. The error intervals of the GPS records represent a confidence factor in the GPS location estimation which result in ellipses as shown in FIG. 4. The probability of the location of smartphone 301 is uniformly distributed within each ellipsis of the error intervals for each GPS record in the plot.

In order to determine the frequent location of smartphone 301, frequent location determination system 340 finds the intersections of the ellipses from the extracted GPS records transferred from smartphone 301 while in cell sector 326. As shown in FIG. 4, the intersection of the three exemplary error intervals is highlighted in black. This selected intersection is a high probability area of a frequent location of smartphone 301. In examples where there are a greater number of ellipses, the intersection that is shared by the greatest number of ellipses would be selected as the highest probability area of a frequent location of smartphone 301. The center of the intersection area would then be reported as the frequent location of smartphone 301. In this manner, a frequent location of smartphone 301 is estimated with greater accuracy, while minimizing the exposure of private data associated with smartphone 301.

Figure 5:
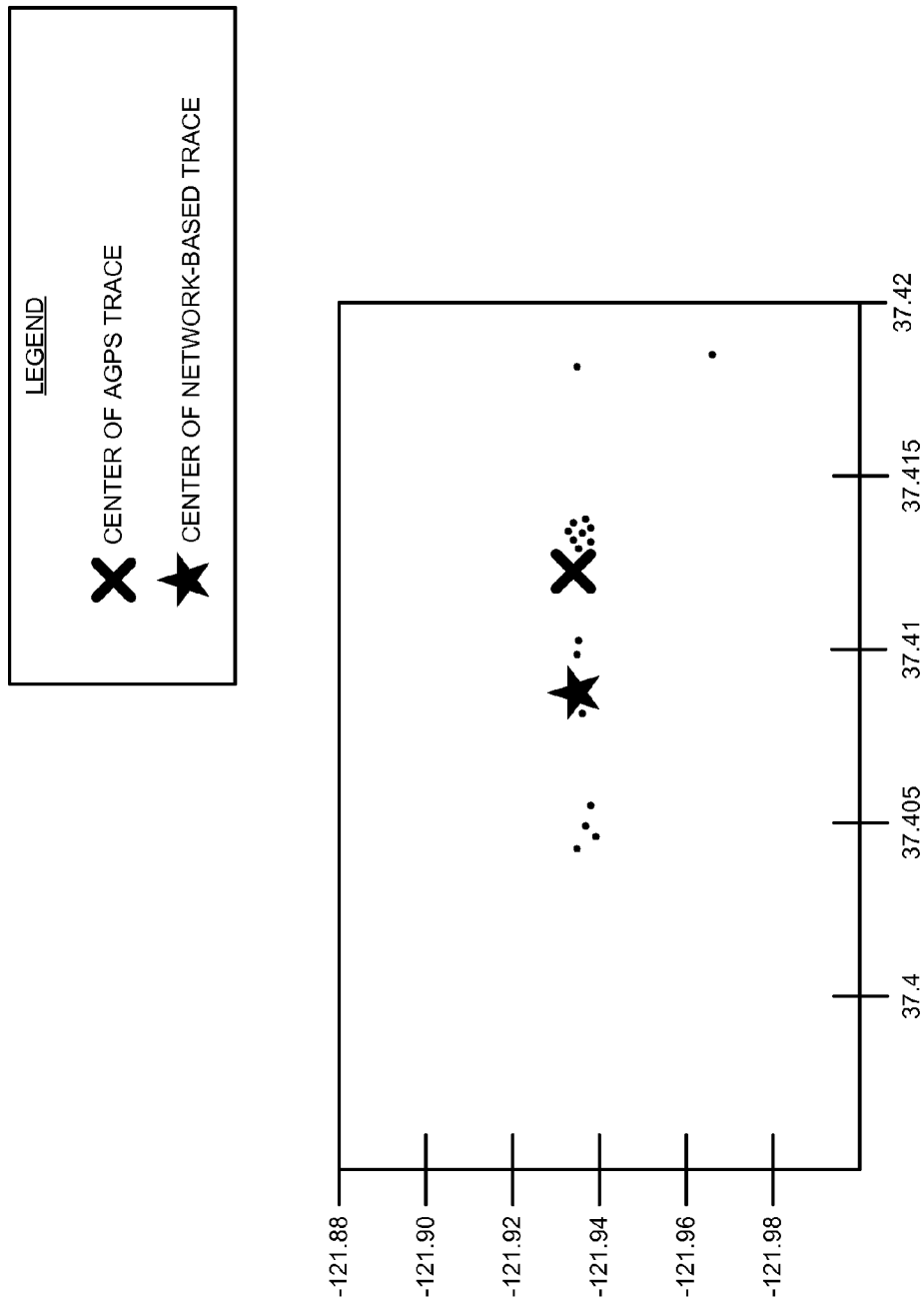
FIG. 5 is a trend diagram that illustrates a user trace within a cell sector in an exemplary embodiment.

FIG. 5 is a trend diagram that illustrates a user trace within cell sector 326 in an exemplary embodiment. Again, as discussed above with respect to FIG. 3, location determination system 340 has identified cell sector 326 as being used by smartphone 301 more than any of the other cell sectors 322-325, 327, and 328. In this example, Assisted GPS (AGPS) records are transferred from smartphone 301 while located in cell sector 326 and collected by frequent location determination system 340 for a period of time. These AGPS records are then plotted as shown by the small dots appearing in the chart of FIG. 5. Network-based location estimations are not shown in FIG. 5 for clarity.

The centroid of both the network-based traces of smartphone 301 and the AGPS location estimations are then plotted in the trend diagram. As shown in the legend appearing in FIG. 5, the center of the AGPS traces of smartphone 301 for cell sector 326 is designated by the "X" symbol, and the center of the network-based traces is designated by the star symbol. The distance between the two centroids represents the network estimation error which is corrected and enhanced by using the AGPS traces. Therefore, the centroid of the extracted AGPS records for smartphone 301 in cell sector 326 is reported as the frequent location of smartphone 301 in this example, as shown by the large "X" in the trend diagram of FIG. 5. Advantageously, the actual AGPS data is not reported, so that the privacy of the user of smartphone 301 is preserved, but the frequent location of smartphone 301 is determined with greater accuracy by using the AGPS data to augment the network-based location estimations.

Figure 6:
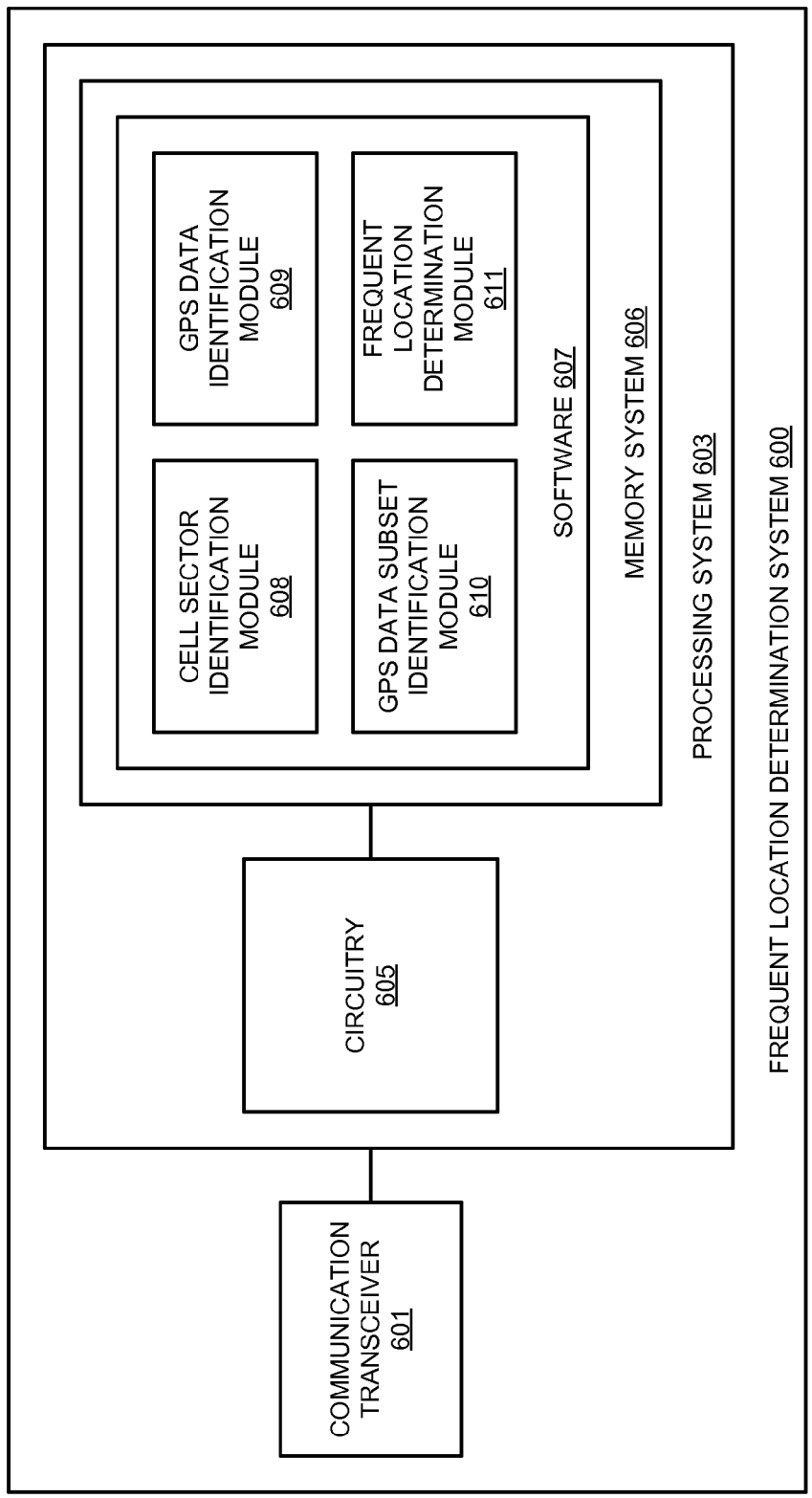
FIG. 6 is a block diagram that illustrates a frequent location determination system.

FIG. 6 is a block diagram that illustrates frequent location determination system 600. Frequent location determination system 600 provides an example of frequent location determination systems 140 and 340, although systems 140 and 340 may use alternative configurations. Frequent location determination system 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608-611.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 could be configured to receive network usage data for a wireless communication device. Further, communication transceiver 601 could be configured to receive user data transferred by a wireless communication device from a cell sector.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-611, although software 607 could have alternative configurations in some examples.

When executed by circuitry 605, operating software 607 directs processing system 603 to operate as described herein for frequent location determination system 140. In particular, operating software 607 directs processing system 603 to process network usage data for a wireless communication device to identify a cell sector in a wireless communication network that is used by the wireless communication device more than a plurality of other cell sectors in the wireless communication network. Operating software 607 may further direct processing system 603 to process user data transferred by the wireless communication device from the cell sector to identify Global Positioning System (GPS) data. Operating software 607 may further direct processing system 603 to process the GPS data to determine a subset of the GPS data that indicates locations in the cell sector. Operating software 607 may further direct processing system 603 to process the subset of the GPS data that indicates the locations in the cell sector to determine a frequent location of the wireless communication device within the cell sector.

In this example, operating software 607 comprises a cell sector identification software module 608 that processes network usage data for a wireless communication device to identify a cell sector in a wireless communication network that is used by the wireless communication device more than a plurality of other cell sectors in the wireless communication network. Additionally, operating software 607 comprises a GPS data identification software module 609 that processes user data transferred by the wireless communication device from the cell sector to identify Global Positioning System (GPS) data. Operating software 607 also comprises a GPS data subset identification software module 610 that processes the GPS data to determine a subset of the GPS data that indicates locations in the cell sector. Further, operating software 607 comprises a frequent location determination software module 611 that processes the subset of the GPS data that indicates the locations in the cell sector to determine a frequent location of the wireless communication device within the cell sector.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of identifying a location frequented by a wireless communication device, the method comprising:
    processing network usage data for the wireless communication device to identify a cell sector in a wireless communication network that is used by the wireless communication device more than a plurality of other cell sectors in the wireless communication network;
    processing user data transferred by the wireless communication device from the cell sector to identify Global Positioning System (GPS) data;
    processing the GPS data to determine a subset of the GPS data that indicates locations in the cell sector; and
    processing the subset of the GPS data that indicates the locations in the cell sector to determine a frequent location of the wireless communication device within the cell sector.

2. The method of claim 1 wherein processing the user data transferred by the wireless communication device from the cell sector to identify the GPS data comprises identifying the GPS data that correlates to a base station identifier associated with the cell sector.

3. The method of claim 1 wherein processing the user data transferred by the wireless communication device from the cell sector to identify the GPS data comprises processing the user data transferred by the wireless communication device while in the cell sector to identify the GPS data.

4. The method of claim 1 wherein processing the GPS data to determine the subset of the GPS data that indicates the locations in the cell sector comprises eliminating from the GPS data any information that indicates a location outside of the cell sector.

5. The method of claim 1 wherein processing the subset of the GPS data that indicates the locations in the cell sector to determine the frequent location of the wireless communication device within the cell sector comprises ordering the subset of the GPS data according to time stamps associated with the subset of the GPS data.

6. The method of claim 5 wherein ordering the subset of the GPS data according to the time stamps associated with the subset of the GPS data comprises ranking more recent data of the subset of the GPS data higher than other data of the subset of the GPS data.

7. The method of claim 6 wherein processing the subset of the GPS data that indicates the locations in the cell sector to determine the frequent location of the wireless communication device within the cell sector comprises determining the frequent location of the wireless communication device within the cell sector based on the more recent data of the subset of the GPS data.

8. A frequent location determination system to identify a location frequented by a wireless communication device, the system comprising:
    a processing system comprising circuitry configured to process network usage data for the wireless communication device to identify a cell sector in a wireless communication network that is used by the wireless communication device more than a plurality of other cell sectors in the wireless communication network, process user data transferred by the wireless communication device from the cell sector to identify Global Positioning System (GPS) data, process the GPS data to determine a subset of the GPS data that indicates locations in the cell sector, and process the subset of the GPS data that indicates the locations in the cell sector to determine a frequent location of the wireless communication device within the cell sector.

9. The system of claim 8 wherein the processing system configured to process the user data transferred by the wireless communication device from the cell sector to identify the GPS data comprises the processing system configured to identify the GPS data that correlates to a base station identifier associated with the cell sector.

10. The system of claim 8 wherein the processing system configured to process the user data transferred by the wireless communication device from the cell sector to identify the GPS data comprises the processing system configured to process the user data transferred by the wireless communication device while in the cell sector to identify the GPS data.

11. The system of claim 8 wherein the processing system configured to process the GPS data to determine the subset of the GPS data that indicates the locations in the cell sector comprises the processing system configured to eliminate from the GPS data any information that indicates a location outside of the cell sector.

12. The system of claim 8 wherein the processing system configured to process the subset of the GPS data that indicates the locations in the cell sector to determine the frequent location of the wireless communication device within the cell sector comprises the processing system configured to order the subset of the GPS data according to time stamps associated with the subset of the GPS data.

13. The system of claim 12 wherein the processing system configured to order the subset of the GPS data according to the time stamps associated with the subset of the GPS data comprises the processing system configured to rank more recent data of the subset of the GPS data higher than other data of the subset of the GPS data.

14. The system of claim 13 wherein the processing system configured to process the subset of the GPS data that indicates the locations in the cell sector to determine the frequent location of the wireless communication device within the cell sector comprises the processing system configured to determine the frequent location of the wireless communication device within the cell sector based on the more recent data of the subset of the GPS data.

15. A computer apparatus to identify a location frequented by a wireless communication device, the apparatus comprising:
    software instructions configured, when executed by a computer system, to direct the computer system to process network usage data for the wireless communication device to identify a cell sector in a wireless communication network that is used by the wireless communication device more than a plurality of other cell sectors in the wireless communication network, process user data transferred by the wireless communication device from the cell sector to identify Global Positioning System (GPS) data, process the GPS data to determine a subset of the GPS data that indicates locations in the cell sector, and process the subset of the GPS data that indicates the locations in the cell sector to determine a frequent location of the wireless communication device within the cell sector; and
    at least one non-transitory computer-readable storage medium storing the software instructions.

16. The apparatus of claim 15 wherein the software instructions configured to direct the computer system to process the user data transferred by the wireless communication device from the cell sector to identify the GPS data comprises the software instructions configured to direct the computer system to identify the GPS data that correlates to a base station identifier associated with the cell sector.

17. The apparatus of claim 15 wherein the software instructions configured to direct the computer system to process the user data transferred by the wireless communication device from the cell sector to identify the GPS data comprises the software instructions configured to direct the computer system to process the user data transferred by the wireless communication device while in the cell sector to identify the GPS data.

18. The apparatus of claim 15 wherein the software instructions configured to direct the computer system to process the GPS data to determine the subset of the GPS data that indicates the locations in the cell sector comprises the software instructions configured to direct the computer system to eliminate from the GPS data any information that indicates a location outside of the cell sector.

19. The apparatus of claim 15 wherein the software instructions configured to direct the computer system to process the subset of the GPS data that indicates the locations in the cell sector to determine the frequent location of the wireless communication device within the cell sector comprises the software instructions configured to direct the computer system to order the subset of the GPS data according to time stamps associated with the subset of the GPS data.

20. The apparatus of claim 19 wherein the software instructions configured to direct the computer system to order the subset of the GPS data according to the time stamps associated with the subset of the GPS data comprises the software instructions configured to direct the computer system to rank more recent data of the subset of the GPS data higher than other data of the subset of the GPS data, and wherein the frequent location of the wireless communication device within the cell sector is determined based on the more recent data of the subset of the GPS data.

* * * * *